H. SCHNEIDER.
BRAKE GEARING.
APPLICATION FILED AUG. 3, 1918.
1,309,964.
Patented July 15, 1919.
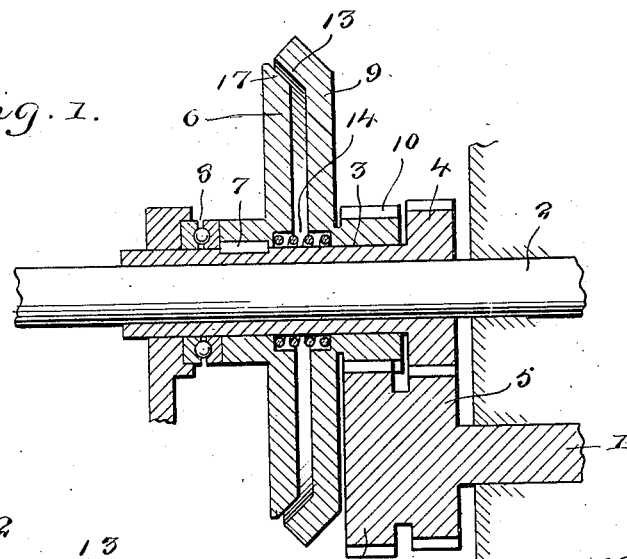
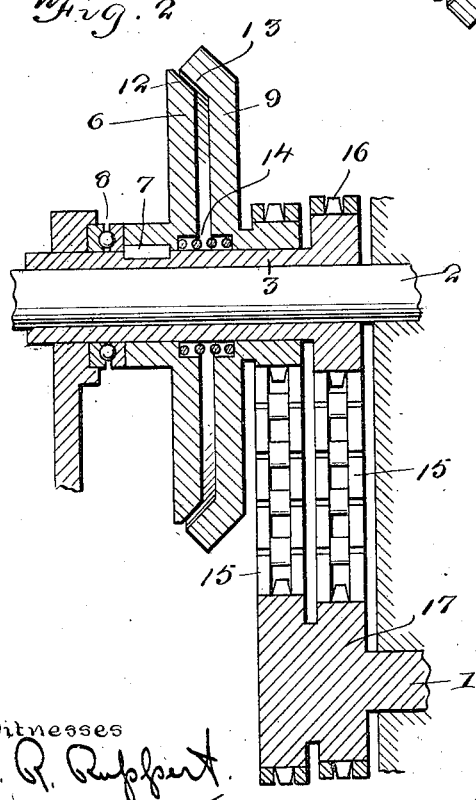
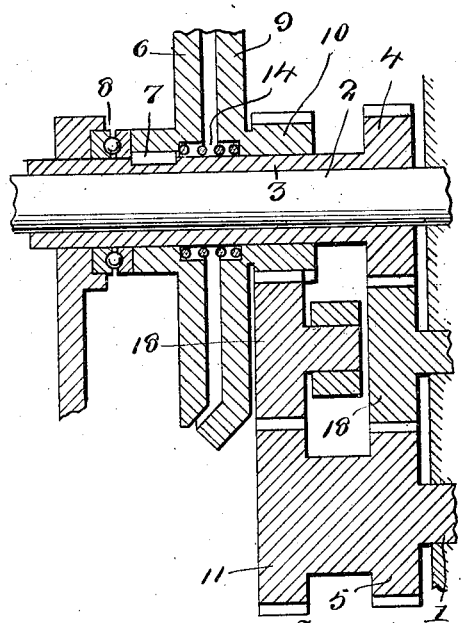

UNITED STATES PATENT OFFICE.

HANS SCHNEIDER, OF NEW YORK, N. Y.

BRAKE-GEARING.

1,309,964.  Specification of Letters Patent.  Patented July 15, 1919.

Application filed August 3, 1918. Serial No. 248,142.

*To all whom it may concern:*

Be it known that I, HANS SCHNEIDER, a citizen of Switzerland, residing at New York, in the county of New York and State of New York, have invented new and useful Improvements in Brake-Gearings, of which the following is a specification.

This invention relates to brake gearing and is especially designed for use in connection with motor vehicles, the broad object in view being to provide brake mechanism which will do away with the unsatisfactory brake mechanism now commonly employed in motor vehicle practice and which in most instances involves the use of a fixed or non-rotary brake member in connection with a rotary brake member which ordinarily revolves at high speed, the result being excessive friction, overheating of the brake members and rapid wear, the same often resulting in serious accidents.

More specifically stated, the object of the present invention is to produce brake mechanism involving the use of two brake members rotating simultaneously in the same direction but at different speeds, the difference in the speed of rotation of said brake members being preferably slight, so as to materially reduce the wear and tear on the brake shoes or members, excessive friction and rapid deterioration of the brake mechanism, as a whole, also reducing the wear and tear on the tires and mechanism of the motor vehicle as a whole.

With the above and other objects in view, the invention consists in the construction, combination and arrangement of parts, as herein described, illustrated and claimed.

In the accompanying drawings:

Figure 1 is a sectional view of the improved brake gearing, in one embodiment thereof.

Figs. 2 and 3 are sectional views showing other transmission means between the rotating shaft and the non-rotating shaft or support.

Referring to the drawings, 1 designates a rotary shaft which may be any shaft of a motor vehicle, while 2 designates a non-rotary shaft, constituting in effect a support for certain elements of the brake mechanism hereinafter described. Mounted rotatably or loosely upon the support 2 is a sleeve or a tubular shaft 3 having fixed on one end thereof a gear 4 which is driven by a gear 5 on the driving shaft 1.

Mounted upon the sleeve 3 is a brake member 6, said member 6 rotating with the sleeve 3 and being for that purpose connected to the sleeve 3 by means of a feather or spline 7 which adapts the brake member 6 to slide longitudinally upon said sleeve 3. 8 designates an end thrust ball bearing which surrounds the sleeve 3 but is loose thereon and takes the end thrust of the hub of the brake member 6 when braking power is applied to the mechanism. The end thrust bearing 8 may be supported or braced in any suitable way. 9 designates a brake shoe which is adapted to work in coöperative relation to the brake member 6, said brake shoe 9 being loose upon the sleeve 3 and having in fixed relation thereto a gear 10 which meshes with and is driven by another gear 11 on the driving shaft 1. The brake members 6 and 9 are shown as formed with beveled male and female working faces 12 and 13 respectively, but it will be apparent that any form may be given to the working faces of the brake members. For example, the disk like adjacent faces of the brake members may be used as the working faces. I do not, therefore, desire to be restricted to the use of any special form of working faces on the brake members. An expansion spring 14 surrounds the sleeve 3 between the brake members 6 and 9 so as to yieldingly hold said brake members apart, said spring, however, permitting the brake members to be thrown into coöperative relation to each other. Any suitable means may be employed for shifting the brake member 9 against the brake member 6 or vice versa, said means being left to the option of the manufacturer or designer of the motor vehicle.

Suppose, for example, the gear 5 has 21 teeth while the gear 11 has 22 teeth, and that the gear 4 has 20 teeth while the gear 10 has 21 teeth. The ratio of difference in speed between the two brake members is equal to one rotation in 420 revolutions. When the brake members are pressed together, the relative movement between said brake members is resisted as they are being driven at different speeds and it requires considerable effort on the part of the driving shaft to overcome such resistance. The result is a braking effect on the vehicle. I do not, of course, desire to be restricted to the above proportions or number of teeth specified as it will be apparent that the number of teeth may be changed at will, according to varying requirements of the manufacturer. It will also be apparent that any suitable means may be employed for transmitting motion from the gear 5 to the gear 4 and from the gear 11 to the gear 10 as illustrated in Fig. 2, wherein I employ chains 15 running around sprocket wheels 16 and 17 on the shafts 1 and 2 respectively, or in Fig. 3, wherein I show intermediate gears 18 between the gears 4 and 5 and between the gears 10 and 11. The essential feature of the invention resides in imparting rotary motion to the brake members 6 and 9 simultaneously in the same direction but at different speeds together with any means for bringing said brake members into coöperative or braking relation to each other.

I claim:—

In brake gearing, the combination of a driving shaft, a stationary shaft, a tubular shaft rotatably mounted on said stationary shaft, a male brake member splined to said tubular shaft, a female brake member rotatably mounted on the tubular shaft, spring means for holding the said members apart, a thrust bearing for the male member, a gear connected with said female member, a gear connected with the tubular shaft, said gears being at different diameters and a pair of gears of different diameters on the driving shaft meshing with said gears.

In testimony whereof I affix my signature.

HANS SCHNEIDER.

Copies of this patent may be obtained for five cents each, by addressing the "Commissioner of Patents, Washington, D. C."